Nov. 9, 1948.　　　　M. C. WARDLE ET AL　　　　2,453,607
CENTER OF GRAVITY LOCATION INDICATOR
Filed June 6, 1944　　　　　　　　　　　　　　2 Sheets-Sheet 1
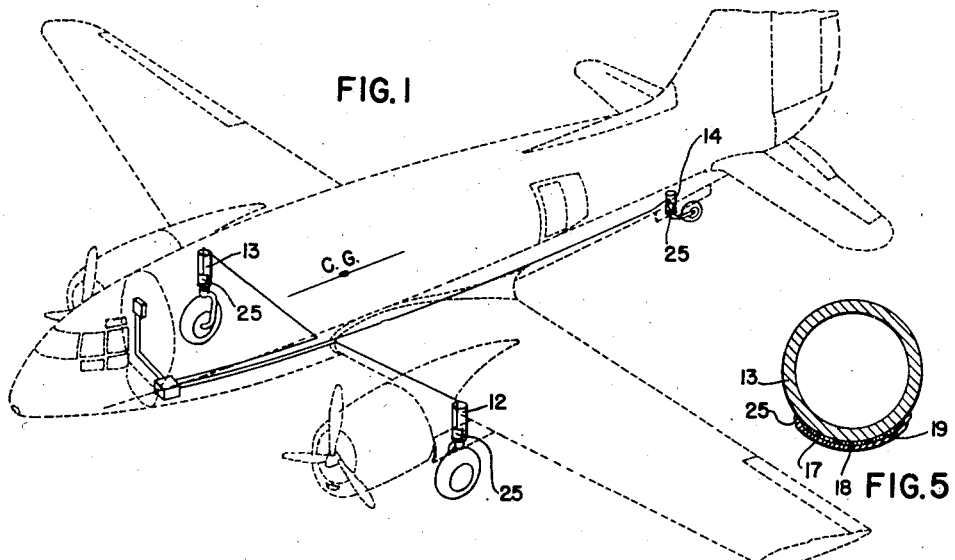
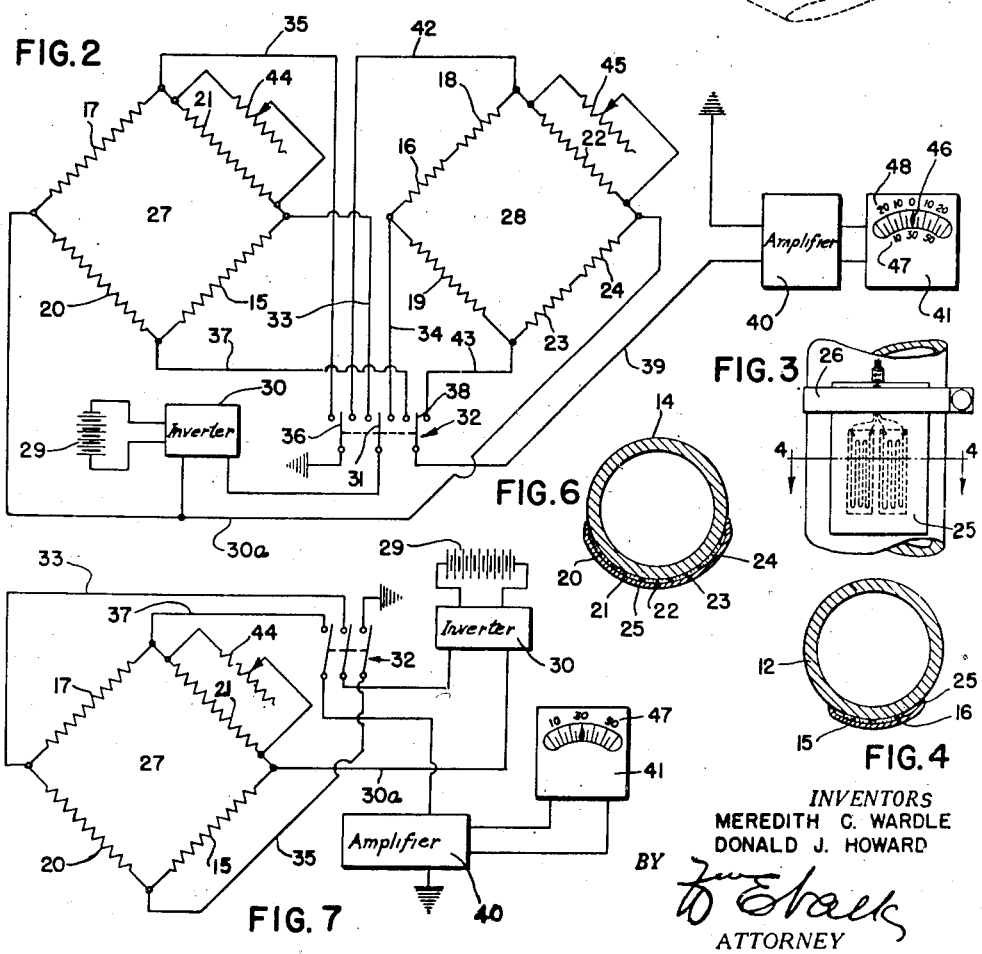
INVENTORS
MEREDITH C. WARDLE
DONALD J. HOWARD
BY
ATTORNEY Nov. 9, 1948.　　　M. C. WARDLE ET AL　　　2,453,607
CENTER OF GRAVITY LOCATION INDICATOR
Filed June 6, 1944　　　　　　　　　　　　　2 Sheets-Sheet 2
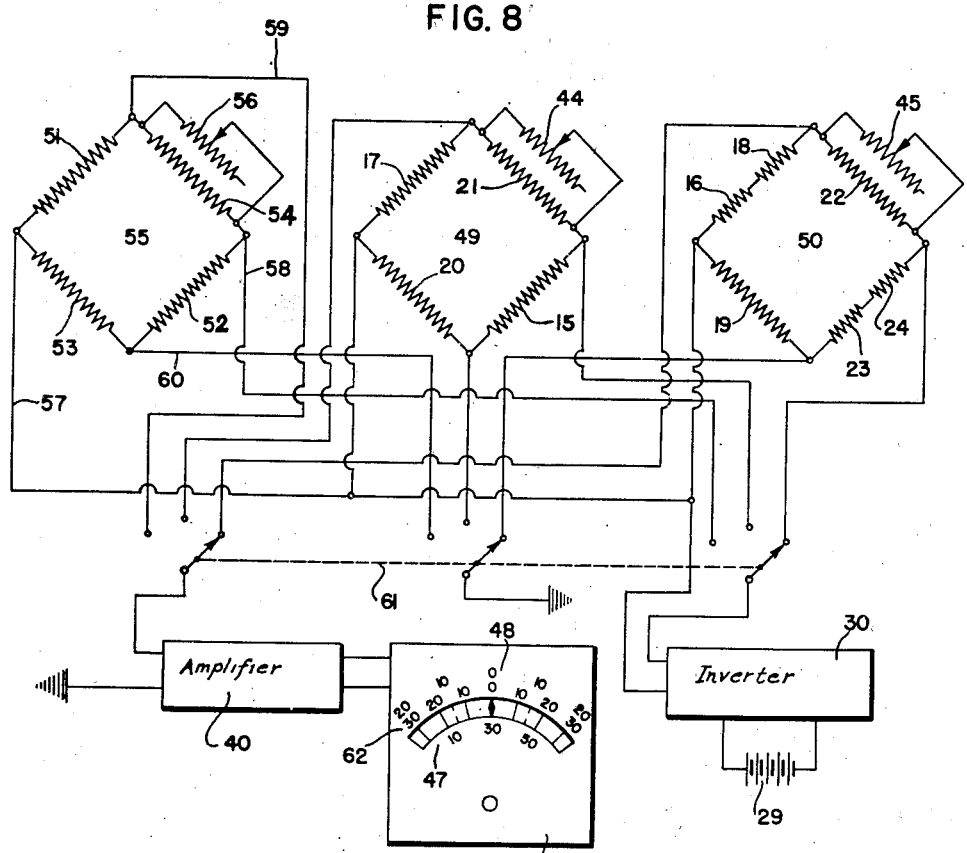
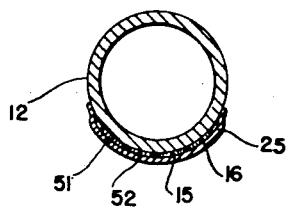
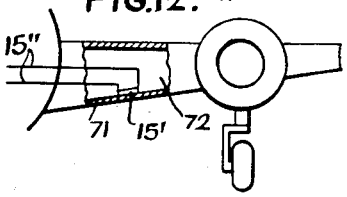
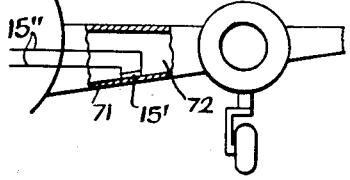
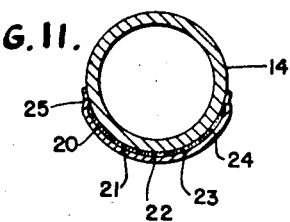
INVENTORS
MEREDITH C. WARDLE
DONALD J. HOWARD
BY
ATTORNEY Patented Nov. 9, 1948

2,453,607

UNITED STATES PATENT OFFICE 2,453,607

CENTER OF GRAVITY LOCATION INDICATOR

Meredith C. Wardle, Buffalo, and Donald J. Howard, Akron, N. Y., assignors to Curtiss-Wright Corporation, a corporation of Delaware Application June 6, 1944, Serial No. 539,016

3 Claims. (Cl. 73—65)

This invention relates to a load distribution indicator which, although not necessarily limited to such use, is characterized by features which render it of particular utility in connection with the loading of aircraft, being adapted when so employed to indicate the location of the center of gravity of the aircraft at any stage of loading and hence enabling the loading operations to be conducted by instrumentation in such a manner that upon completion of such operations the center of gravity of the aircraft will be located within predetermined safe and efficient limits.

One object of the invention is to provide an indicator which may be incorporated in an aircraft as an accessory.

A further object is to provide an indicator which is adapted not only to show the location of the center of gravity but which is also operative to indicate the weight of the load.

A still further object is to provide an indicator which is adapted to show the lateral location of the center of gravity as well as the longitudinal location.

A still further object is to provide an indicator which is of high sensitivity and which, therefore, will be operative to indicate accurately and within close tolerances the exact location of the center of gravity of an airplane.

A still further object is an indicator wherein provision is made for automatically compensating for temperature variations which might otherwise render the indications inaccurate.

The invention contemplates an indicator which is so designed that deformation of load-bearing members by a load may be availed of in obtaining the location of the center of gravity of the load-carrying structure with respect to certain of its principal axes and the weight of the load. To this end the indicator includes conductor elements, commonly referred to as strain gauges, of the type adapted to offer a resistance to the flow of electric current which varies in accordance with the degree to which they are stressed, the said elements being associated with the load-carrying members in such a manner that any changes in the stressing of said members causes, or is accompanied by, corresponding changes in the stressing of the conductor elements. The latter are connected in Wheatstone bridge circuits in such a manner that current outputs may be obtained from said circuits which will be directly proportional to the weight of the load and to any displacement of the center of gravity caused by the load and hence which may be translated into, and indicated in, appropriate units.

The indicator is illustrated in the accompanying drawings, wherein:

Figure 1 is a perspective view of an airplane carrying an indicator embodying the features of the invention; Figure 2 is a wiring diagram of the indicator; Figure 3 is a fragmentary elevational view of that portion of one of the landing gear struts which carries strain responsive elements of the indicator; Figure 4 is a section through said strut and is taken along line 4—4 of Figure 3; Figures 5 and 6 are similar sectional views through the other strut of the landing gear and the tail wheel strut, respectively, and show the arrangement of the strain responsive elements carried by these struts; Figure 7 is a wiring diagram generally similar to that shown in Figure 2 but wherein weight indication is not desired, and hence not provided for; Figure 8 is a wiring diagram of a modified form of indicator wherein provision is made not only for showing the longitudinal location of the center of gravity of the load-carrying structure and the weight of the load but also the lateral location of the center of gravity; Figures 9, 10 and 11 are sectional views similar to Figure 4, illustrating the arrangement of the strain responsive elements of the modified indicator on the struts of the landing gear and tail wheel; and Figure 12 is a front view of an airplane, with parts broken away, to illustrate an alternate location of a strain responsive element.

The indicator is illustrated by way of example in connection with an airplane of the cargo type, the main struts of the landing gear being indicated on each side of the longitudinal axis of symmetry at 12 and 13 while the tail wheel strut is indicated at 14 on the axis of symmetry. The said struts constitute three primary points of support and are subjected to strains proportional to the load which they bear. In accordance with the invention strain gauges 15 and 16 are carried by the strut 12 (Figure 4); gauges 17, 18 and 19 are carried by the strut 13 (Figure 5) and gauges 20, 21, 22, 23 and 24 (Figure 6) are carried by the strut 14. All of the gauges with the exception of 19 and 22 are bonded or otherwise applied to their respective struts. They may be of any suitable type so long as they are sensitive to the degree necessary and responsive to strut strain throughout the range of loads involved. As axial distortion only is availed of in the embodiments of the invention illustrated, the strain gauges are arranged directionally so that they have maximum sensitivity with respect to distortion in such direction, it being understood, however, that the said gauges may, if desired, be applied to other portions of the landing gear which may be subjected to bending moments. Curved plates 25 may be arranged over the strain gauges for protective purposes, the said plates preferably being of the same metal as the struts, or having the same coefficient of expansion, and being suitably secured to the struts by bands 26, or otherwise.

The gauge 19 which is carried by the landing gear strut 13 and the gauge 22 which is carried by the tail wheel strut 14 are for temperature compensating purposes in obtaining weight indication in a manner to be described. They are free of, and not subject to stresses developed in, the struts 13 and 14, being bonded, or otherwise affixed to the plates 25. Any changes in the conductivity of the gauges 19 and 22, therefore, will be caused only by such expansion and contraction as may result in changes in temperature of the said plates and is for the purpose of balancing such changes in the conductivity of the gauges 15, 16, 17, 18, 20, 21, 23 and 24 as may be caused by expansion and contraction of the struts 12, 13 and 14 in response to such temperature changes.

Referring to Figure 2, it will be noted that the gauges 15, 17, 20 and 21 form the arms of a Wheatstone bridge 27 while the gauges 16 and 18, 19, 22 and 23 and 24 form the arms of a second bridge 28, gauges 16 and 18 and the gauges 23 and 24 forming single arms of the latter bridge. Current is supplied to the bridges 27 and 28 from a battery 29, direct current from the latter preferably being converted into alternating current of any desired frequency by an inverter 30. A line 30a connects one side of the output of the inverter to each of the bridges while a contact 31 of a switch 32 is operative in one position of the switch to connect the other side of the output of the inverter to the bridge 27 through a line 33 and is operative in another position of the switch to connect the other side of the output of the inverter to the bridge 28 through a line 34.

When the switch 32 is operated to supply current to the bridge 27 an output line 35 is grounded by a contact 36 of the switch. The other output line 37 is connected by a contact 38 of the switch and a line 39 to one side of an amplifier 40, the other side of which is grounded. The output of the amplifier is measured on a suitable meter 41. On the other hand, when the switch 32 is operated to supply current to the bridge 28 an output line 42 of the latter is grounded through the contact 36 while the other output line 43 is connected by the contact 38 and line 39 to one side of the amplifier 40.

From the foregoing it will be apparent that when the switch 32 is operated to connect the bridge 27 to the current source, any output from the bridge as a result of any unbalance in the arms 15, 17, 20 and 21 will be amplified by the amplifier 40, the amplified output being indicated upon the meter 41. Likewise when the switch 32 is operated to connect the bridge 28 to the current source any output from the latter bridge as a result of any unbalance in its arms will be amplified by the amplifier and the amplified output indicated upon the meter 41. A variable resistance 44 which is connected in parallel with the strain gauge 21 is adjustable to balance the bridge 27 at zero load while a similar resistance 45 which is connected in parallel with the strain gauge 22 is adjustable to balance the bridge 28, the two bridges being balanced in the manner described when the airplane with which the indicator is employed is empty.

It will be noted that the strain gauges 15 and 17 of the bridge 27 are responsive to strains developed in the landing gear struts 12 and 13, respectively, while the strain gauges 20 and 21 are both responsive to strains developed in the tail wheel strut. Hence when the switch 32 is operated to connect the bridge 27 to the source of current and any cargo which has been loaded into the airplane is properly distributed, the weight of such cargo will add to the strain upon the landing wheel and tail wheel struts in such a manner that any changes in the resistance of the strain gauges 15 and 17 will balance out the changes in resistance of the strain gauges 20 and 21. The bridge, therefore, will remain balanced and there will be no deflection of the pointer 46 of the meter 41. Any improper distribution of the load in a longitudinal direction, however, will unbalance the bridge, the degree of unbalance varying directly as the magnitude of the displacement of the center of gravity and the resultant bridge output, as amplified, will be indicated upon the meter 41 on a scale 47, the latter being calibrated in terms of percentage of the mean aerodynamic chord (M.A.C.).

After the longitudinal center of gravity location has been determined in the manner described, the switch 32 is operated to connect the bridge 28 to the source of current. Referring to the said bridge, it will be noted that the strain gauges 16 and 18 which are carried by the landing wheel struts 12 and 13, respectively, form one arm only of the bridge while the gauges 23 and 24 which are both carried by the tail wheel strut 14 form the opposite arm of the bridge. As the product of the resistances of one pair of opposing arms of a Wheatstone bridge is equal to the product of the resistances of the other pair of opposing arms, when the bridge is balanced, and as the resistance of the strain gauges 19 and 22 remains constant, except for variations caused by temperature, it will be apparent that the current output of the bridge will increase directly as the load increases upon the struts regardless of the distribution of the load. Hence the weight of the load may be indicated upon a scale 48 on the meter, the said scale being calibrated in pounds or any other desired units. In this connection it will be apparent that as the gauges 19 and 22 are bonded to the plates 25, and as the latter have substantially the same coefficient of expansion as the struts, any variations in the strain gauges which are bonded to the struts as a result of expansion or contraction of the struts in response to temperature changes will be automatically balanced out by corresponding changes in the resistance of the strain gauges on the plates 25.

It will be understood, of course, that the center of gravity location with respect to the longitudinal axis of symmetry of the aircraft may be obtained without an indication of the weight of the load and hence that if distribution only is of importance, the bridge 28 and wiring employed in connection with such bridge may be eliminated. An indicator so simplified is illustrated in Figure 7.

A modified form of the invention is illustrated in Figure 8 for indicating not only the longitudinal location of the center of gravity and the weight of the load but also the lateral location of the center of gravity. In this embodiment the bridges 49 and 50 are similar to the bridges 27 and 28, respectively, and the strain gauges which constitute their arms are carried by the struts 12 and 13 of the landing wheels and the strut 14 of the tail wheel in the manner heretofore described.

In order to enable the lateral location of the center of gravity to be determined, additional strain gauges 51 and 52 are bonded to the landing wheel strut 12 while similar gauges 53 and 54 are bonded to the landing wheel strut 13. These gauges form the arms of a third Wheatstone bridge 55, a variable resistance 56 being connected across the strain gauge 54 so that the bridge may be balanced along with the bridges 49 and 50 when the airplane is empty. Alternating current may be supplied to the bridge through lines 57 and 58 from the inverter 30 while lines 59 and 60 of the bridge may be connected by a switch 61 to the amplifier 40 and the output of the amplifier indicated upon the meter, the latter carrying a third scale 62 which is traversed by the pointer to indicate in any desired units the lateral location of the center of gravity. In this connection it will be noted that, since the strain gauges 51 and 52 are carried by one of the landing wheel struts while the gauges 53 and 54 are carried by the other landing wheel strut, there will be no output from the bridge 55 so long as any load which is added to the airplane is properly distributed, that is to say the weight of such load does not unbalance the airplane in a lateral direction. Any load which causes displacement of the center of gravity in a lateral direction, however, will unbalance the bridge 55 and this will be shown upon the meter 41, an indication of the lateral location of the center of gravity being of particular advantage in aircraft in which substantial latitude exists for lateral dispersal of the load such as for example in aircraft of the flying wing and twin-hulled types.

From the foregoing it will be apparent that in the embodiment of the invention illustrated in Figure 8, the switch 61 may be operated to connect each of the bridges 49, 50 and 55 to the alternating current source and at the same time connect the output of the respective bridge to the meter 41. The indicators described have the advantage that they may be readily incorporated in new and existing airplanes with facility and without involving material structural changes. A further advantage obtained is that the application of an alternating current across the various bridges and the amplification of the output of the latter enable highly accurate readings to be obtained.

It is to be undestood that the strain gauges of the indicators need not necessarily be applied to the struts of the landing and tail wheels of the airplane. Other members of the latter such as the principal beams or spar members of the wings are similarly stressed by the loads and hence may, if desired, be availed of in the same manner as the struts. For example in Figure 12 a strain gauge 15¹, with leads 15¹¹ extending therefrom, is shown mounted upon the bottom flange 71 of the main beam or spar 72 of the aircraft wing at a point between the fuselage and landing gear. It will be understood that the load on this spar, and hence the strain induced in strain gage 15¹, will vary with the gross weight and load distribution of the airplane in much the same manner as does the load on landing gear strut 12.

We claim as our invention:

1. In an aircraft provided with a first landing gear strut disposed substantially along the longitudinal vertical plane of symmetry of the aircraft, and second and third landing gear struts in longitudinally spaced relation to the first strut and spaced on opposite sides of said plane, said struts being subject to strains proportionate to the loads borne thereby; a plurality of strain gage means, each such gage means being secured to one of said struts to be strained thereby according to the load induced strain in such strut, a Wheatstone bridge circuit having in opposite arms thereof such strain gage means that are secured to each of said second and third struts, the bridge circuit having in the other two arms thereof such strain gage means secured to the first strut, a source of electric current connected across opposing arm junctions of said bridge, and a current responsive indicator connected across the other opposing arm junctions of the bridge, whereby the indicator will reflect changes in direction and degree of changes in longitudinal position of the center of gravity of the aircraft.

2. In an aircraft having three ground load supports each subject to strain proportionate to the portion of the total aircraft ground load borne thereby, one of the supports being spaced longitudinally of the aircraft from the other two supports, the combination therewith of means for indicating the fore and aft location of the aircraft center of gravity, said means comprising: a plurality of electrical resistance type strain gages each of which is secured to one of said supports to be strained thereby according to the load induced strain in such support, a Wheatstone bridge circuit having in opposite arms thereof such strain gages secured to said one of said supports and having in the other two arms thereof such strain gages secured to each of the other two supports; a source of alternating electric current connected across opposing arm junctions of said bridge; an alternating current amplifier connected across the other opposing arm junctions of the bridge to receive and amplify the bridge current output; and an indicator connected to the amplifier and responsive to the current output thereof for reflecting the location of the center of gravity of the aircraft.

3. In an aircraft having first and second ground load support means spaced in opposite directions from the aircraft center of gravity, each of said support means being subject to strains proportionate to the loads borne thereby, the combination therewith of means for indicating the location of the aircraft center of gravity in the direction of such spacing of said support means, said indicating means comprising: a plurality of electrical resistance type strain gages secured to said support means to be strained thereby according to the load induced strain in the support means, a Wheatstone bridge circuit having in opposite arms thereof such strain gages secured to said first support means and having in the other two arms thereof such strain gages secured to said second support means; a source of electric current connected across opposing arm junctions of said bridge; a current amplifier connected across the other opposing arm junctions of the bridge to receive and amplify the bridge current output; and an indicator connected to the amplifier and responsive to the curent output of the latter for reflecting the location of the center of gravity of the aircraft.

MEREDITH C. WARDLE.
DONALD J. HOWARD.

(References on following page)

REFERENCES CITED

The following references are of record in the file of this patent:

UNITED STATES PATENTS

| Number | Name | Date |
|---|---|---|
| 1,407,078 | Murray | Feb. 21, 1922 |
| 1,864,876 | Westrum | June 28, 1932 |
| 2,179,822 | Imm | Nov. 14, 1939 |
| 2,252,464 | Kearns et al. | Aug. 12, 1941 |
| 2,255,814 | Roche | Sept. 16, 1941 |
| 2,322,319 | Ruge | June 22, 1943 |
| 2,344,642 | Ruge | Mar. 21, 1944 |
| 2,373,504 | Schlieben et al. | Apr. 10, 1945 |

FOREIGN PATENTS

| Number | Country | Date |
|---|---|---|
| 387,887 | Great Britain | Feb. 16, 1933 |
| 549,140 | Great Britain | Nov. 9, 1942 |

OTHER REFERENCES

Page 259 of The Scientific American for Nov. 1, 1934.